United States Patent [19]
Weinberg et al.

[11] Patent Number: 5,892,153
[45] Date of Patent: Apr. 6, 1999

[54] GUARD BANDS WHICH CONTROL OUT-OF-PLANE SENSITIVITIES IN TUNING FORK GYROSCOPES AND OTHER SENSORS

[75] Inventors: Marc S. Weinberg, Needham, Mass.; John C. Pinson, Anheim, Calif.

[73] Assignee: The Charles Stark Draper Laboratory, Inc., Cambridge, Mass.

[21] Appl. No.: 752,570

[22] Filed: Nov. 21, 1996

[51] Int. Cl.$^6$ .................................................... G01P 9/04
[52] U.S. Cl. .................................... 73/504.16; 73/504.12
[58] Field of Search ........................... 73/504.16, 504.12, 73/504.14, 504.15, 504.04

[56] References Cited

U.S. PATENT DOCUMENTS

| | | | |
|---|---|---|---|
| Re. 32,931 | 5/1989 | Staudte | 73/505 |
| Re. 33,479 | 12/1990 | Juptner et al. | 73/505 |

(List continued on next page.)

FOREIGN PATENT DOCUMENTS

| | | |
|---|---|---|
| 55-121728 | 9/1980 | Japan . |
| 58-136125 | 8/1983 | Japan . |
| 59-037722 | 3/1984 | Japan . |
| 59-158566 | 9/1984 | Japan . |
| 61-144576 | 7/1986 | Japan . |
| 62-071256 | 8/1987 | Japan . |
| 62-221164 | 9/1987 | Japan . |
| 63-169078 | 7/1988 | Japan . |
| 2183040 | 5/1987 | United Kingdom . |
| 9201941 | 2/1992 | WIPO . |
| 9305401 | 3/1993 | WIPO . |

OTHER PUBLICATIONS

Barth, P.W. et al., "A Monolithic Silicon Accelerometer With Integral Air Damping an Overrange Protection", 1988 *IEEE*, pp. 35–38.

Boxenhorn, B., et al., "An Electrostatically Rebalanced Micromechanical Accelerometer," *AIAA Guidance, Navigation and Control Conference*, Boston, Aug. 14–16, 1989, pp. 118–122.

Boxenhorn, B., et al., "Micromechanical Inertial Guidance System and its Application", *Fourteenth Biennial Guidance Test Symposium*, vol. 1, Oct. 3–5, 1989, pp. 113–131.

Boxenhorn, B., et al., "Monolithic Silicon Accelerometer", *Transducers '89*, Jun. 25–30, 1989, pp. 273–277.

Boxenhorn, B., et al., "A Vibratory Micromechanical Gyroscope", *AIAA guidance, Navigation and Control Conference*, Minneapolis, Aug. 15–17, 1988, pp. 1033–1040.

Howe, R., et al., "Silicon Micromechanics : Sensors and Actuators on a Chip", *IEEE Spectrum*, Jul. 1990, pp. 29–35.

Moskalik, L., "Tensometric Accelerometers with Overload Protection", *Meas. Tech. (USA)*, vol. 22, No. 12, Dec. 1979 (publ. May 1980), pp. 1469–1471.

Nakamura, M., et al., "Novel Electrochemical Micro-Machining and Its Application for Semiconductor Acceleration Sensor IC ", *Digest of Technical Papers* (1987), Institute of Electrical Engineers of Japan, pp. 112–115.

Petersen, K.E., et al., "Micromechanical Accelerometer Integrated with MOS Detection Circuitry",*IEEE*, vol. ED–29 No. 1 (Jan. 1982), pp. 23–27.

(List continued on next page.)

*Primary Examiner*—John E. Chapman
*Attorney, Agent, or Firm*—Weingarten, Schurgin, Gagnebin & Hayes LLP

[57] ABSTRACT

Guard bands which reduce or eliminate force and sensitivity associated with proof mass motion normal to the substrate as a result of voltage transients is disclosed. The guard bands are biased to reduce the coupling ratio to zero and thereby enable starting and improved performance. Various configurations of guard bands may be employed including distinct inner and outer guard bands, distinct inner guard bands only, extended sense electrodes below inner sensing combs with no outer guards, distinct outer guard bands with extended sense electrodes, and sense electrodes extended beneath both drive and sensing combs.

24 Claims, 7 Drawing Sheets

U.S. PATENT DOCUMENTS

| | | | |
|---|---|---|---|
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Petersen et al. | 73/510 |
| 4,381,672 | 5/1983 | O'Connor et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 5/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Masuda et al. | 356/350 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 6/1988 | Kawamura et al. | 73/510 |
| 4,761,743 | 8/1988 | Wittke | 364/484 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,815,472 | 3/1989 | Wise et al. | 128/675 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,881,410 | 11/1989 | Wise et al. | 73/724 |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver et al. | 73/517 AV |
| 4,898,032 | 2/1990 | Voles | 73/505 |
| 4,899,587 | 2/1990 | Staudte | 73/505 |
| 4,900,971 | 2/1990 | Kawashima | 73/862.59 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,013,396 | 5/1991 | Wise et al. | 156/628 |
| 5,016,072 | 5/1991 | Greiff | 357/26 |
| 5,025,346 | 6/1991 | Tang | 361/283 |
| 5,038,613 | 8/1991 | Takenaka et al. | 73/510 |
| 5,055,838 | 10/1991 | Wise et al. | 340/870 |
| 5,060,039 | 10/1991 | Weinberg et al. | 357/26 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,195,371 | 3/1993 | Greiff | 73/505 |
| 5,203,208 | 4/1993 | Bernstein | 73/505 |
| 5,205,171 | 4/1993 | O'Brien et al. | 73/504 |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |
| 5,349,855 | 9/1994 | Bernstein et al. | 73/504.16 |
| 5,481,914 | 1/1996 | Ward | 73/504.16 |
| 5,576,250 | 11/1996 | Diem et al. | 437/228 |
| 5,646,348 | 7/1997 | Greiff et al. | 73/514.36 |

OTHER PUBLICATIONS

Petersen, Kurt E., et al., "Silicon as a Mechanical Material", *Proceedings of the IEEE*, vol. 70, No. 5, May 1982 pp. 420–457.

"Quartz Rate Sensor Replaces Gyros", *Defense Electronics*, Nov. 1984, p. 177.

Rosen, Jerome, "Machining In the Micro Domain", *Mechanical Engineering*, Mar. 1989, pp. 40–46.

*Teknekron Sensor Development Corporation*, article entitled "Micro–Vibratory Rate Sensor", 1080 Marsh Road, Menlo Park, CA 94025, 2 pages, undated.

Bryzek, Janusz et al., "Micromachines on the March", *IEEE Spectrum*, May 1994, pp. 20–31.

IEEE Robotics & Automation Soc, in coop. w/ASME Dynamic Systems & Control Div., "Micro Electro Mechanical Systems, An Investigation of Micro Structures, Sensors, Actuators, Machines and Systems", *IEEE Cat. #93CH3265–6*, Library of Congress #92–56273, Ft. Lauderdale, Fl. Feb. 7,–10 1993.

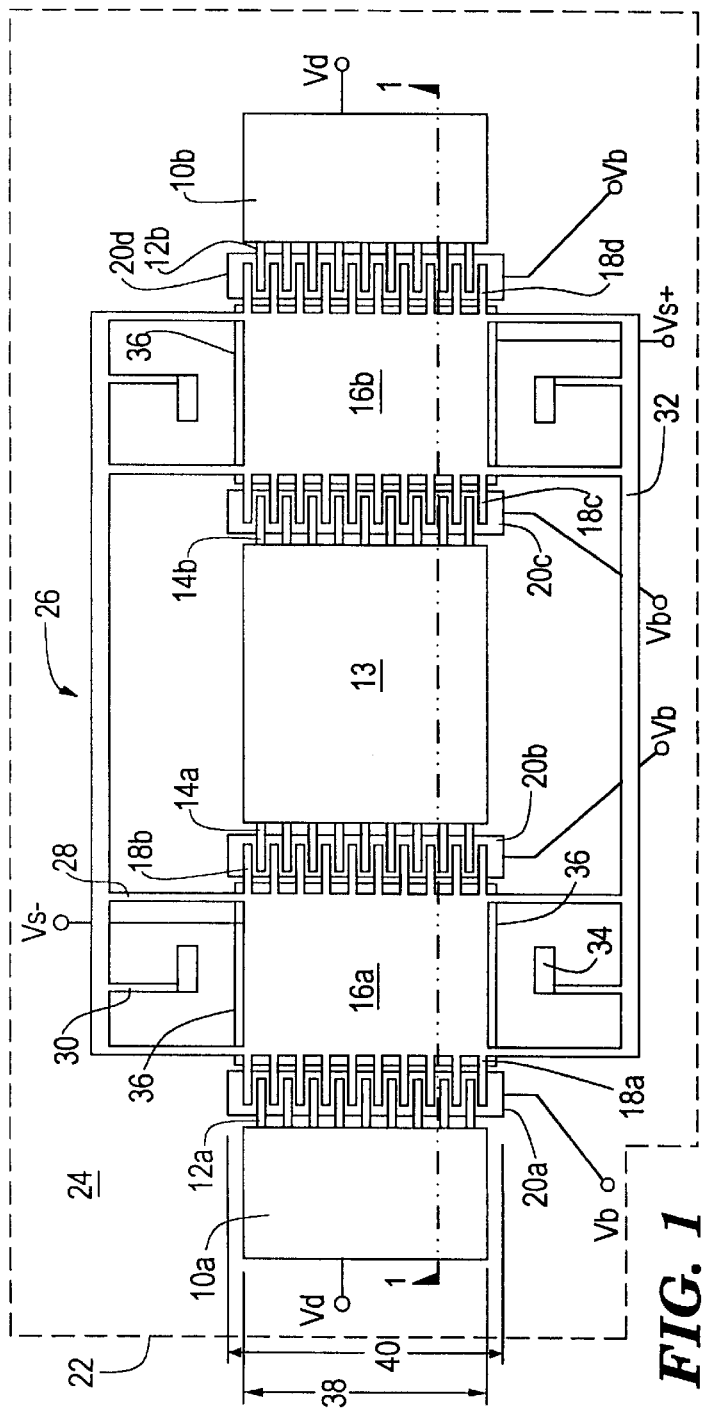
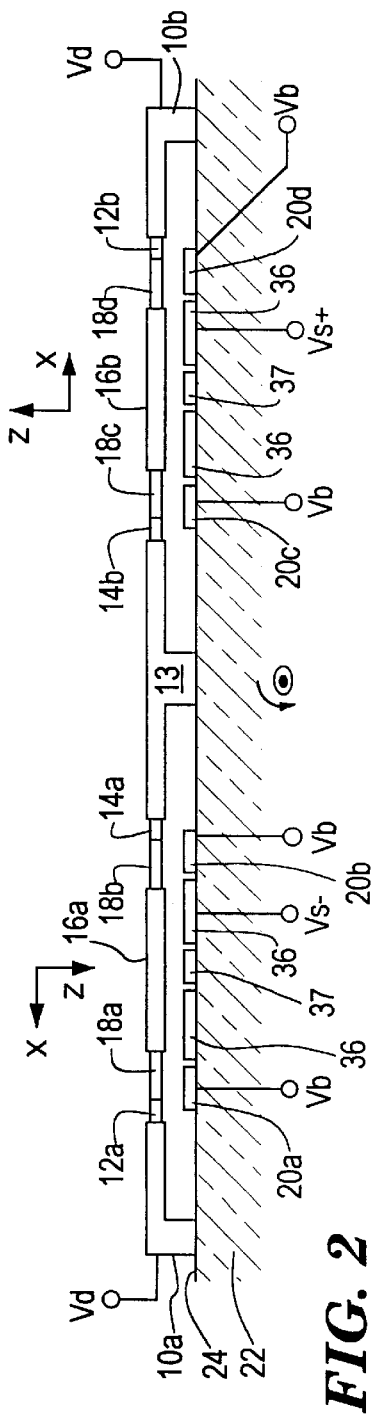
FIG. 1
FIG. 2

5,892,153

GUARD BANDS WHICH CONTROL OUT-OF-PLANE SENSITIVITIES IN TUNING FORK GYROSCOPES AND OTHER SENSORS

FIELD OF THE INVENTION

This invention relates generally to tuning fork gyroscopes, and more particularly to a drive with interleaved comb electrodes which provides vibratory motion in a tuning fork gyroscope.

BACKGROUND OF THE INVENTION

The basic theories of operation and construction of tuning fork gyroscopes are now fairly well known. Such gyroscopes include a substrate, silicon proof masses with comb electrodes, position sensitive pick-offs, sense electrodes, and inner and outer drives with comb electrodes. The proof masses are suspended above the substrate by a support flexure which permits movement of the proof masses relative to the sense electrode, the drive electrodes and the substrate.

The substrate, which is commonly constructed from glass, has a high electrical resistivity which is partially responsible for voltage transients which can adversely effect gyroscope performance. In particular, coupling between comb electrodes is sensitive to such voltage transients. Additionally, the transients impart undesirable vertical (Z-axis) forces normal to the proof masses and pick-off sensitivity. This vertical force and pick-off sensitivity can (a) degrade tuning fork gyroscope performance and (b) prevent the tuning fork gyroscope motor self-oscillator loop from starting.

It is known in the art to attempt to alleviate these problems by shortening the comb electrodes of both the drives and proof masses. However, this technique has at least one potential drawback. Shortening the comb electrodes limits maximum drive amplitude because the combs disengage so that the drive force becomes small. As such, the performance of the tuning fork gyroscope may be adversely affected.

SUMMARY OF THE INVENTION

Guard bands which reduce or eliminate force and sensitivity to proof mass motion normal to the substrate are disclosed. The guard bands are biased to reduce the coupling ratio to zero and thereby enable starting and improved performance. Various configurations of guard bands may be employed including distinct inner and outer guard bands, distinct inner guard bands only, extended sense electrodes below inner sensing combs with no outer guards, distinct outer guard bands with extended sense electrodes, and sense electrodes extended beneath both drive and sensing combs.

The guard bands of the present invention significantly reduce the undesired effects of transient voltages on electrostatic coupling of interleaved comb electrodes. For combs with teeth 3 microns wide, 6 to 7 microns thick and 3 micron spacing and an overlap X, coupling force can be reduced to zero by placing 30% of the drive voltage on the guard band beneath the drive combs. Further, the response coupling force can be made small by exciting the inner guard bands with a voltage roughly 1.6 times the inner comb bias voltage. Such proportionally biased guard bands can provide high performance tuning fork gyroscopes with bias stability better than 1,000°/hr. Further, use of greater length comb electrodes and thus greater maximum drive amplitude become possible. For other dimensions, optimal guard band voltages vary in a predictable manner.

BRIEF DESCRIPTION OF THE DRAWING

These and other features and advantages of the present invention will be more fully understood from the following detailed description of the invention in which:

FIG. 1 is a plan view of a tuning fork gyroscope according to the present invention;

FIG. 2 is a cross-sectional view of the gyroscope of FIG. 1 taken along line 1—1;

DETAILED DESCRIPTION OF THE DRAWING

Figure 2A:
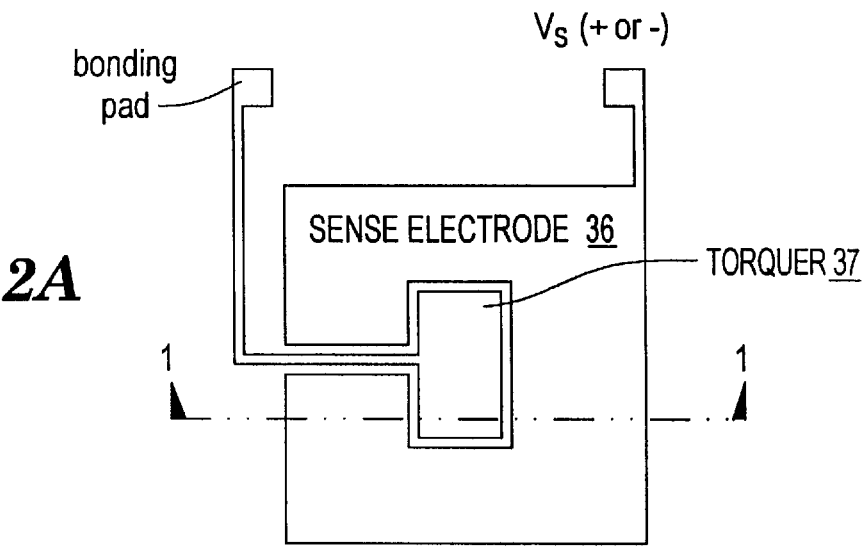
FIG. 2A is a top view of one set of sense electrodes from FIGS. 1 and 2.

Referring to FIGS. 1, 2 and 2A, a tuning fork gyroscope includes outer drives 10a, 10b with comb electrodes 12a, 12b, an inner drive 13 with comb electrodes 14a, 14b, proof masses 16a, 16b with comb electrodes 18a, 18b, 18c, 18d, guard bands 20a, 20b, 20c, 20d, a substrate 22 with an upper surface 24, and a support flexure 26 with drive beams 28, torsion beams 30, base beams 32, anchors 34, sense electrodes 36 and force electrodes 37 (which may be eliminated to reduce exposed glass below the proof mass). The proof masses are suspended above the substrate, and are connected thereto by the support flexure. The anchors connect the torsion beams to the substrate. The torsion beams support the base beams, which in turn support the drive beams. The proof masses are connected to the base beams by the drive beams.

The tuning fork gyroscope functions electromechanically. In operation, the outer drives 10a, 10b impart a vibratory motion to the proof masses 16a, 16b through the comb electrodes 12a, 18a, 18d, 12b. The comb electrodes of the outer drives extend outward toward the adjacent proof mass, and are disposed above the surface of the substrate. The comb electrodes of the adjacent proof mass extend outward toward the outer drive such that the outer drive comb electrodes and proof mass comb electrodes are interleaved. Comb electrodes between adjacent proof masses and inner drives are similarly interleaved. As such, time varying drive signals $V_d$ can be provided to the outer drives to induce electrostatic coupling of comb electrodes, and thereby impart vibratory motion to the proof masses.

Measurement with the tuning fork gyroscope has been described with detail in co-pending U.S. patent application Ser. No. 08/219,023, entitled ELECTRONICS FOR CORIOLIS FORCE AND OTHER SENSORS, filed in the name of Paul Ward, which is incorporated herein by reference. Briefly, a bipolar DC voltage $+V_S$, $-V_S$ is applied to right and left sense electrodes 36, respectively, to establish a potential difference so that a change in proof mass position with respect to the sense electrodes results in a measurable change in capacitance between the sense electrodes and the associated proof masses. In response to an inertial input, and specifically to a rotational rate about an input axis coplanar to the plane of vibration, the proof masses deflect out of the normal plane of vibration. Such out-of-plane deflection of the proof masses occurs at a frequency corresponding to the resonant frequency of the proof masses, and with an amplitude corresponding to the input rotational rate. Thus, detection of out-of-plane deflection of the proof masses as manifested by capacitance change provides a measure of the rotational rate.

Voltages applied to the comb electrodes 12a, 12b, 14a, 14b and to the sense electrodes 36 induce both slow transient and AC voltages in the glass substrate, which is a dielectric with loss factor and high, but finite, electrical resistivity. These voltages tend to degrade tuning fork gyroscope bias and scale factor versus time and temperature. Voltages applied to the outer comb electrodes move the proof mass parallel to the substrate (at constant distance), which is a desired effect. The comb voltages also result in electrostatic forces which move the proof mass normal to the substrate. This normal force is generally not desired. The inner comb electrodes are intended to sense motion parallel to and at constant distance from the substrate, but also sense proof mass motion perpendicular to the substrate. This vertical force and pick-off sensitivity can degrade tuning fork gyroscope performance and prevent the tuning fork gyroscopes motor self-oscillator loop from starting.

The guard bands shield the silicon parts from the substrate voltage transients, and thereby reduce or eliminate the normal force and sensitivity. The guard bands 20a, 20b, 20c, 20d are constructed of conducting material and are disposed on the substrate 22 substantially directly below the interleaved comb electrodes. More particularly, the interleaved comb electrodes have a length 38, and the guard bands extend along the substrate for a length 40 which is equal to or greater than the interleaved comb electrode length.

Figure 3:
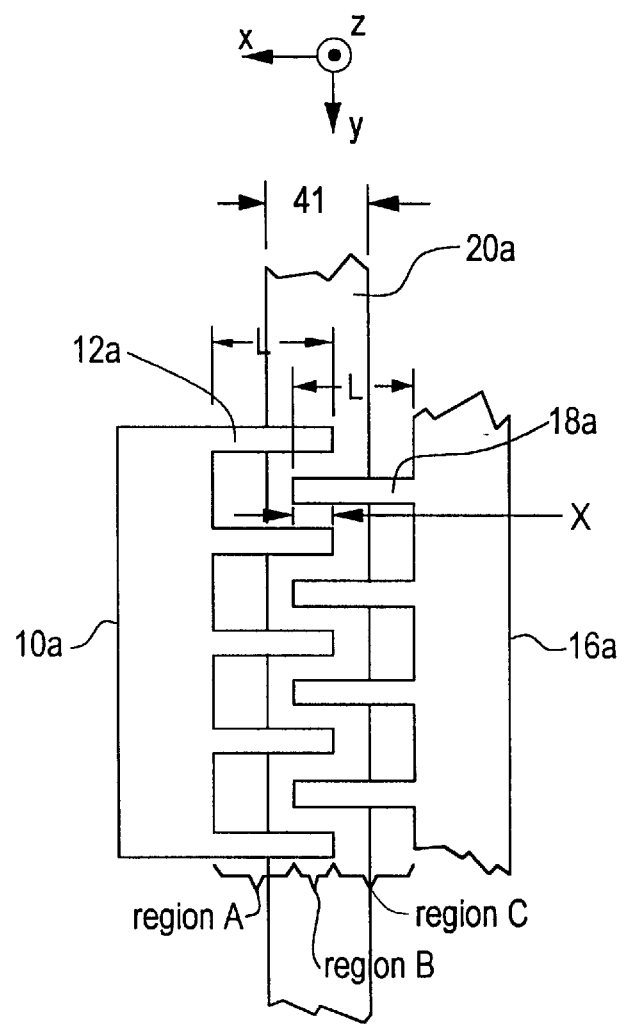
FIG. 3 is an exploded view of the interleaved comb electrodes of the gyroscope of FIG. 2.

Further placement details for the guard bands are illustrated in FIG. 3. The interleaved comb electrodes, e.g., 12a, 18a, have three regions which define width of overlap: region A is an unengaged drive comb electrode region, region B is an engaged comb electrode region, and region C is an unengaged proof mass comb electrode region. Magnitude of region B is directly related to maximum drive amplitude, i.e., greater width affords greater maximum drive amplitude. It should be appreciated, however, that regions A–C vary as the proof mass 16a is vibrated in-plane, and that this variation is taken into account when determining guard band placement. In particular, the guard bands are disposed between the substrate and the comb electrodes such that the guard bands have a width 41 which is greater than or equal to a maximum operational width of region B. The term "overlap region" as used herein refers to the maximum operational width of region B. The guard bands are disposed on the substrate substantially directly below the overlap region.

Figure 4:
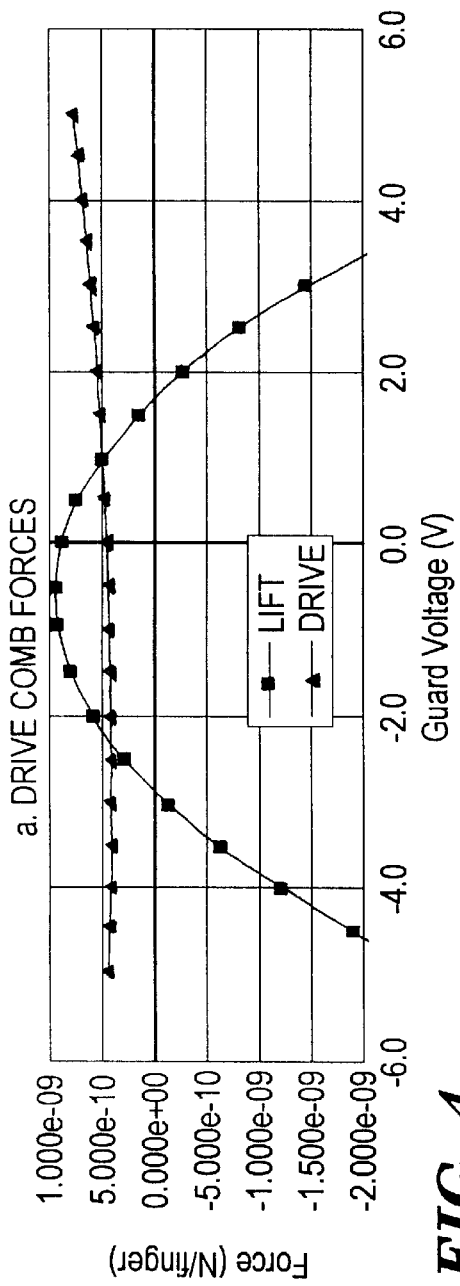
FIG. 4 is a plot of drive forces versus $V_b$ for the gyroscope of FIG. 3.
Figure 5:
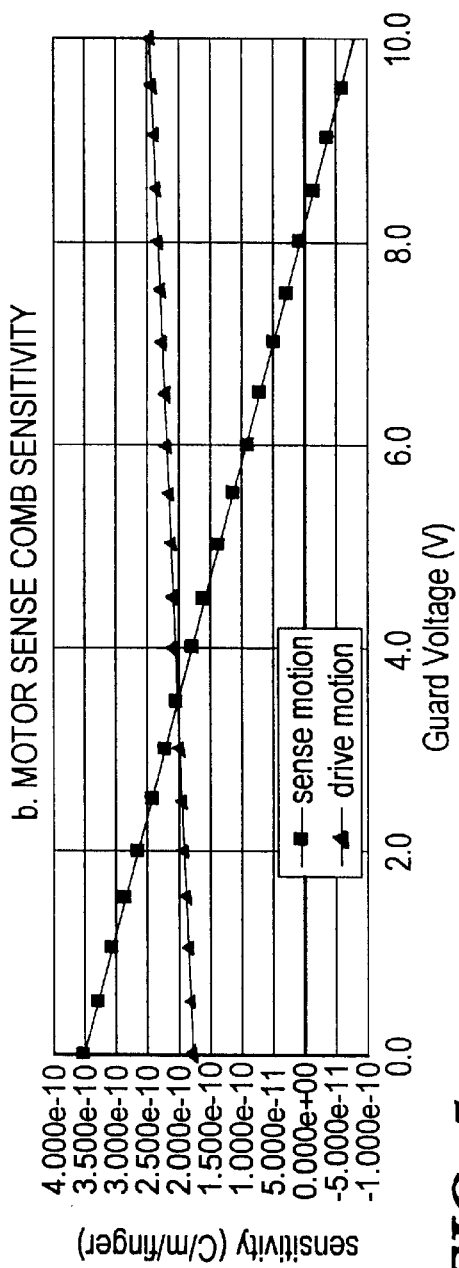
FIG. 5 is a plot of comb sensitivity.

A significant feature of the gyroscope and method is a technique for starting the tuning fork mode where the two proof masses move parallel to the substrate and in opposite directions. The tuning fork gyroscope oscillator is intended to lock onto the tuning fork mode. Because of the out-of-plane effects in the drive (outer) and sensing (inner) combs, it is possible to lock onto the normal motion (out-of-plane mode) and exclude the tuning fork mode. The loop closes to the tuning fork mode when $$\frac{S_F S_S Q_O}{Q_{TF}} \leq \frac{1}{3}$$

where $S_F$=ratio of vertical to horizontal force exerted by the drive combs $S_S$=ratio of vertical to horizontal response of sense combs $Q_O$=quality factor of out-of-plane mode $Q_{TF}$=quality factor of tuning fork mode For tuning fork gyroscopes with perforated plates, $Q_{TF}/Q_O$ is 5 to 10. For contemporary tuning fork gyroscopes built without guard bands and 25 μm of tooth overlap, $S_F=S_S=½$ and the tuning fork mode is easily excited. As shown in FIG. 4 and FIG. 5, with guard bands grounded $S_F=S_S=2$ so that the tuning fork mode is not excited and the gyroscope does not function. By decreasing the overlap of the teeth, it is possible to reduce the coupling ratios $S_F$ and $S_S$ to start successfully. However, decreasing tooth overlap reduces the maximum drive amplitude and hence is generally not desirable. FIG. 4 indicates that the coupling force $S_F$ can be reduced to zero by placing 30% of the drive voltage on the guard band beneath the drive combs 20a, 20d. FIG. 5 indicates that the response coupling $S_F$ can be made small by exciting the inner guard bands 20b, 20C with a voltage roughly 1.6 times the inner comb bias voltage. These voltages are appropriate for a tuning fork gyroscope with combs of approximately 6 to 7 microns thickness, 3 microns width and 3 micron spacing, and will vary with comb length, plate thickness, and comb air gap. This reduction of coupling ratios enables starting and improved performance.

Figure 6:
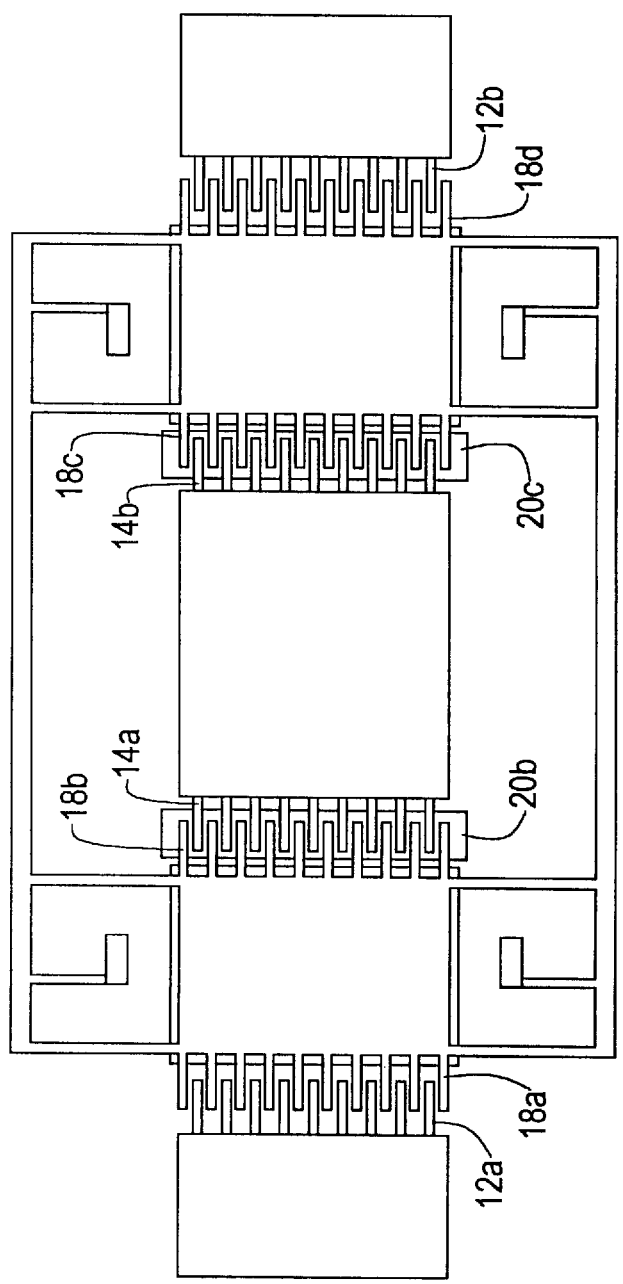
FIG. 6 is an alternative embodiment of the gyroscope.

In an alternative embodiment shown in FIG. 6, guard bands 20b, 20c are placed below the inner interleaved comb electrodes 18b, 14a, 14b, 18c, but not the outer interleaved comb electrodes. It has been found that the undesired effects of transients on unguarded outer comb electrodes are relatively small in comparison to the effects of transients on unguarded inner combs. A savings can thus be realized by forming fewer guard bands since less associated circuitry for driving the guard bands is required. The guard bands under the inner interleaved comb electrodes may be grounded or have a bias voltage applied as described with regard to other embodiments above.

Figure 7:
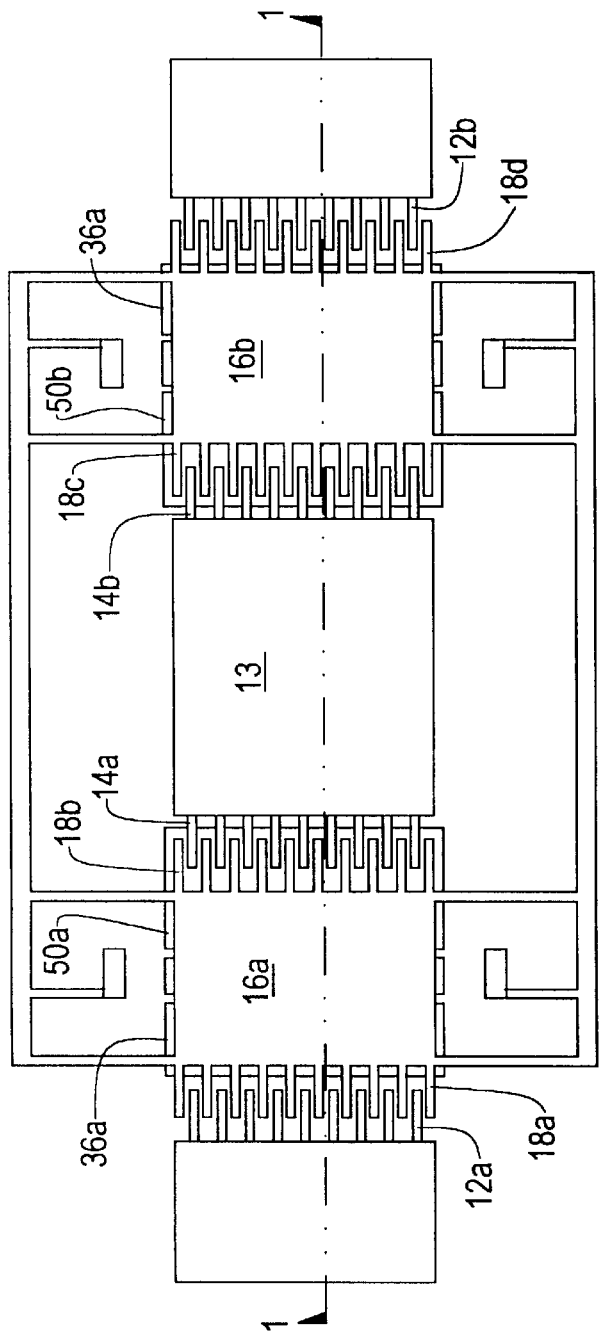
FIG. 7 is another alternative embodiment of the gyroscope.
Figure 8:
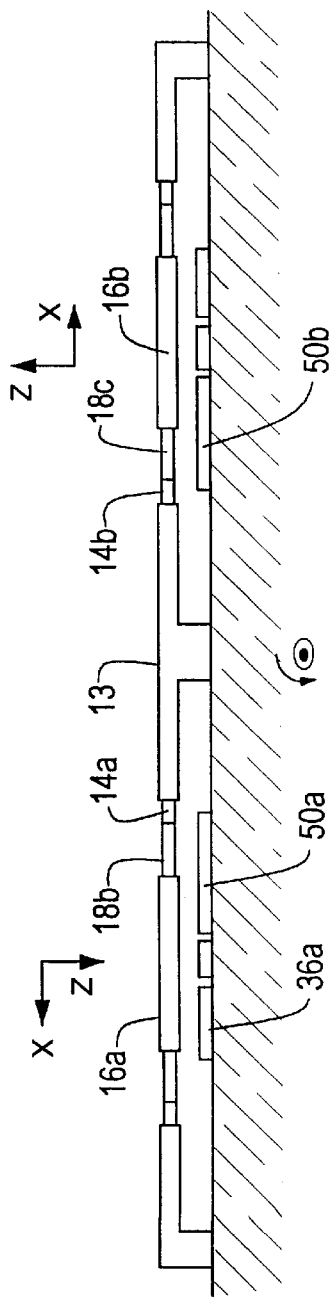
FIG. 8 is a cross-sectional view of the alternative embodiment of FIG. 7 taken along line 1—1.

Another alternative embodiment is shown in FIGS. 7 & 8. In this embodiment extended sense electrodes 50a, 50b are employed to reduce the undesired effect of voltage transients. The extended electrodes 50a, 50b are disposed on the substrate below the proof masses 16a, 16b and extend inward beyond the proof masses to the interleaved comb electrodes 18b, 14a, 14b, 18c. More particularly, the extended sense electrodes are disposed under the overlap region of the interleaved comb electrodes.

The extended sense electrodes may be formed below each set of interleaved comb electrodes, or under the inner interleaved comb electrodes only. (Through experimentation, the inner comb electrode only arrangement has been found to produce tuning fork gyroscopes with bias stability of 1,000+°/hr. This embodiment has a cost savings advantage insofar as manufacturing larger sense electrodes requires little additional effort.)

Figure 9:
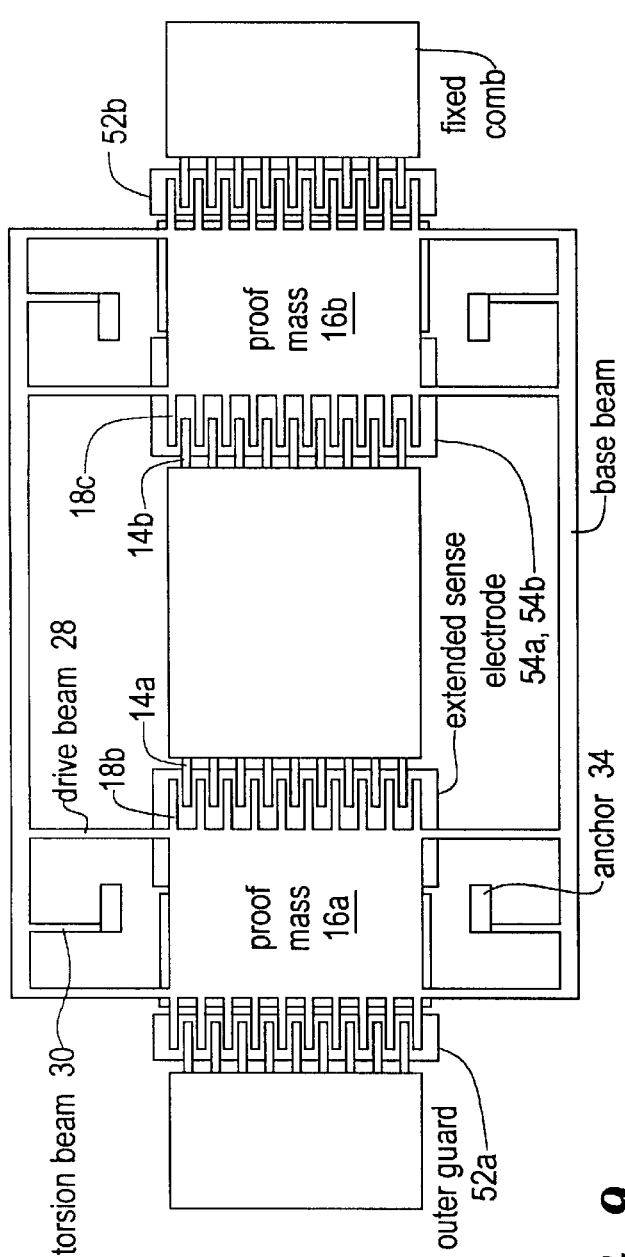
FIGS. 9 and 10 illustrate an alternative embodiment having distinct outer guards and extended sense electrodes.
Figure 10:
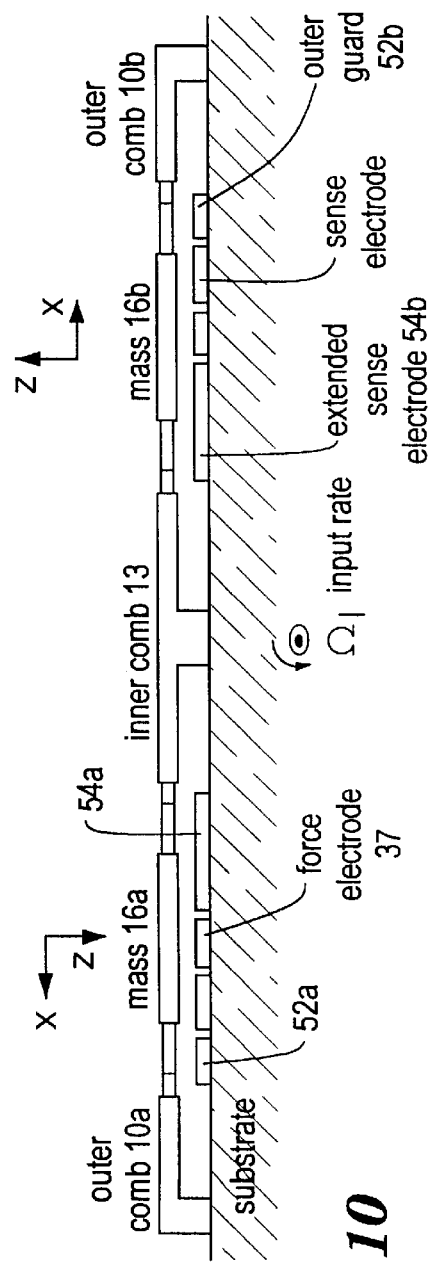

FIGS. 9 and 10 illustrate another alternative embodiment. This embodiment includes distinct outer guard bands 52a, 52b and extended sense electrodes 54a, 54b. The extended electrodes 54a, 54b are disposed on the substrate below the proof masses 16a, 16b and extend inward beyond the proof masses to the interleaved comb electrodes 14a, 14b, 18b, 18c. More particularly, the extended sense electrodes are disposed under the overlap region of the interleaved inner comb electrodes. In this configuration both the sense electrode and the adjacent inner comb have the same bias. As a result, $S_F$ is small and $S_S$ is 0.7, providing a suitable solution to the problem.

Figure 11:
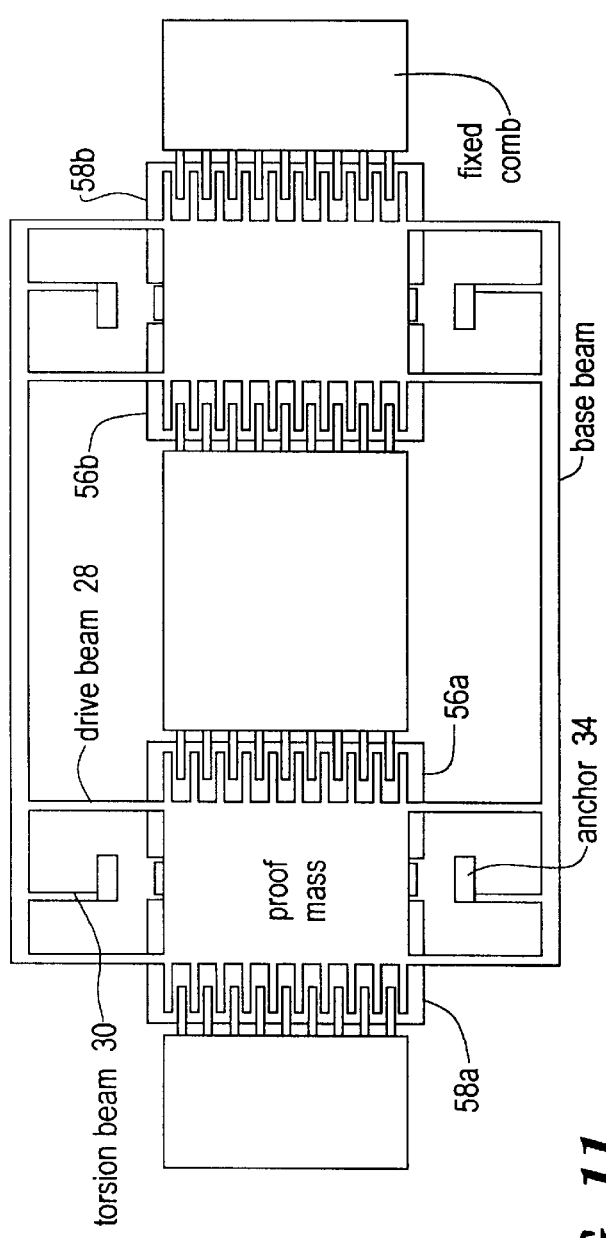
FIGS. 11 and 12 illustrate an alternative embodiment having extended sense electrodes.
Figure 12:
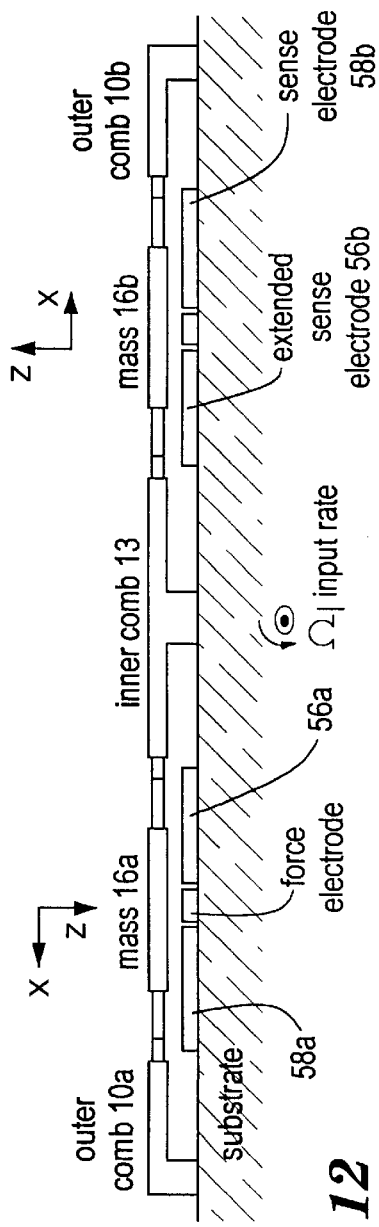

As shown in FIGS. 11 and 12, inner and outer extended sense electrodes 56a, 56b, 58a, 58b may be employed. In this configuration the sense electrodes are extended beneath both the drive and sensing comb electrodes. More particularly, the sense plates may be extended below the drive combs with geometry which satisfies the loop closing equation above. Coupling coefficients $S_F$ and $S_S$ are reduced by thicker proof masses and smaller gaps between teeth. Another possibility is setting $S_S$ (motor sense coupling) to zero (or some other small value) by appropriate selection of motor sense and inner guard band (or extended sense plate) voltages and allowing a larger $S_F$ (motor drive coupling). The guard bands may also be extended below the suspension beams for more isolation of glass effects.

It should be understood that the invention is not limited to the particular embodiments shown and declared herein, but that various changes and modifications may be made without departing from the spirit and scope of this novel concept as defined by the following claims.

What is claimed is:

1. A tuning fork gyroscope comprising:
   a substrate with a surface;
   an outer drive with comb electrodes to which drive signals are applied;
   an inner drive with comb electrodes;
   proof masses with inner and outer comb electrodes, said proof masses suspended above said substrate by a support flexure, said inner comb electrodes interleaved with said inner drive comb electrodes and said outer comb electrodes interleaved with said outer drive comb electrodes, an overlap region defined by said interleaved comb electrodes;
   sense electrodes disposed on said substrate below said proof masses, a voltage applied to said sense electrodes to detect capacitive changes; and
   guard bands formed on said substrate substantially between said inner and outer interleaved comb electrodes and said substrate.

2. The tuning fork gyroscope of claim 1 wherein at least one bias voltage is applied to said guard bands.

3. The tuning fork gyroscope of claim 2 wherein said bias voltage is proportional to the drive signals.

4. The tuning fork gyroscope of claim 2 wherein said bias voltage is proportional to the voltage applied to the sense electrodes.

5. The tuning fork gyroscope of claim 4 wherein the bias voltage applied to the outer guard bands is approximately 30% of the drive voltage.

6. The tuning fork gyroscope of claim 5 wherein the bias voltage applied to the inner guard bands is approximately 1.6 times the inner comb electrode bias voltage.

7. The tuning fork gyroscope of claim 1 wherein said guard bands have a width which is greater than or equal to said overlap region.

8. The tuning fork gyroscope of claim 7 wherein said guard bands are constructed of a conducting material.

9. A tuning fork gyroscope comprising:
   a substrate with a surface;
   an outer drive with comb electrodes to which drive signals are applied;
   an inner drive with comb electrodes;
   proof masses with inner and outer comb electrodes, said proof masses suspended above said substrate by a support flexure, said inner comb electrodes interleaved with said inner drive comb electrodes and said outer comb electrodes interleaved with said outer drive comb electrodes, an overlap region defined by said interleaved comb electrodes;
   sense electrodes disposed on said substrate below said proof masses, a voltage applied to said sense electrodes to detect capacitive changes; and
   guard bands formed on said substrate substantially between said inner interleaved comb electrodes and said substrate.

10. The tuning fork gyroscope of claim 9 wherein a bias voltage is applied to said guard bands.

11. The tuning fork gyroscope of claim 10 wherein said bias voltage is proportional to the drive signals.

12. The tuning fork gyroscope of claim 10 wherein said bias voltage is proportional to the voltage applied to the sense electrodes.

13. The tuning fork gyroscope of claim 12 wherein said bias voltage is approximately sixty percent greater than said voltage applied to the sense electrodes.

14. The tuning fork gyroscope of claim 9 wherein said guard bands have a width which is greater than or equal to said overlap region.

15. The tuning fork gyroscope of claim 14 wherein said guard bands are constructed of a conducting material.

16. A tuning fork gyroscope comprising:
    a substrate with a surface;
    an outer drive with comb electrodes to which drive signals are applied;
    an inner drive with comb electrodes;
    proof masses with inner and outer comb electrodes, said proof masses suspended above said substrate by a support flexure, said inner comb electrodes interleaved with said inner drive comb electrodes and said outer comb electrodes interleaved with said outer drive comb electrodes, an overlap region defined by said interleaved comb electrodes; and
    sense electrodes disposed on said substrate and extended below said proof masses substantially between said inner interleaved comb electrodes and said substrate, wherein a bias voltage that is proportional to the drive signals is applied to said extended sense electrodes.

17. The tuning fork gyroscope of claim 16 wherein said extended sense electrodes have a width which is greater than or equal to said overlap region.

18. A tuning fork gyroscope comprising:
    a substrate with a surface;
    an outer drive with comb electrodes to which drive signals are applied;
    an inner drive with comb electrodes;
    proof masses with inner and outer comb electrodes, said proof masses suspended above said substrate by a support flexure, said inner comb electrodes interleaved with said inner drive comb electrodes and said outer comb electrodes interleaved with said outer drive comb electrodes, an overlap region defined by said interleaved comb electrodes;
    sense electrodes disposed on said substrate and extended below said proof masses substantially between said inner interleaved comb electrodes and said substrate, a voltage applied to said sense electrodes to detect capacitive changes; and
    guard bands formed on said substrate substantially between said outer interleaved comb electrodes and said substrate.

19. The tuning fork gyroscope of claim 18 wherein a bias voltage is applied to said guard bands.

20. The tuning fork gyroscope of claim 19 wherein said bias voltage is proportional to the drive signals.

21. The tuning fork gyroscope of claim 20 wherein said bias voltage is approximately 30% of the drive signal voltage.

22. The tuning fork gyroscope of claim 21 wherein said guard bands have a width which is greater than or equal to said overlap region.

23. A tuning fork gyroscope comprising:

a substrate with a surface;

an outer drive with comb electrodes to which drive signals are applied;

an inner drive with comb electrodes;

proof masses with inner and outer comb electrodes, said proof masses suspended above said substrate by a support flexure, said inner comb electrodes interleaved with said inner drive comb electrodes and said outer comb electrodes interleaved with said outer drive comb electrodes, an overlap region defined by said interleaved comb electrodes;

a first set of sense electrodes disposed on said substrate and extended below said proof masses substantially between said inner interleaved comb electrodes and said substrate, a first voltage applied to said sense electrodes to detect capacitive changes; and a second set of sense electrodes disposed on said substrate and extended below said proof masses substantially between said outer interleaved comb electrodes and said substrate, a second voltage applied to said sense electrodes to detect capacitive changes.

24. The tuning fork gyroscope of claim 23 wherein said first and second voltages are proportional to the drive signals.

* * * * *